(12) United States Patent
Birsan

(10) Patent No.: US 7,389,373 B2
(45) Date of Patent: Jun. 17, 2008

(54) ASYNCHRONOUS ARBITRATION DEVICE AND MICROCONTROLLER COMPRISING SUCH AN ARBITRATION DEVICE

(75) Inventor: Laurentiu Birsan, Bouguenais (FR)

(73) Assignee: Atmel Nantes SA, Nantes Cedex (FR)

( * ) Notice: Subject to any disclaimer, the term of this patent is extended or adjusted under 35 U.S.C. 154(b) by 165 days.

(21) Appl. No.: 11/479,969

(22) Filed: Jun. 30, 2006

(65) Prior Publication Data

US 2007/0016731 A1 Jan. 18, 2007

(30) Foreign Application Priority Data

Jul. 1, 2005 (FR) .................................. 05 07105

(51) Int. Cl.
*G06F 12/00* (2006.01)
*H03K 5/19* (2006.01)
(52) U.S. Cl. ........................................ 710/241; 329/19
(58) Field of Classification Search ................ 710/240, 710/241, 244; 711/100, 106, 147, 150; 327/19
See application file for complete search history.

(56) References Cited

U.S. PATENT DOCUMENTS

| | | | | |
|---|---|---|---|---|
| 4,398,105 A | * | 8/1983 | Keller | .......................... 327/19 |
| 4,841,178 A | * | 6/1989 | Bisson | .......................... 327/19 |
| 4,998,030 A | * | 3/1991 | Cates | ........................... 327/19 |
| 5,179,705 A | * | 1/1993 | Kent | ........................... 710/241 |
| 5,381,551 A | * | 1/1995 | Maeda et al. | ................ 710/244 |
| 5,579,492 A | * | 11/1996 | Gay | ............................ 710/110 |
| 5,930,502 A | | 7/1999 | Picco et al. | |
| 6,453,425 B1 | | 9/2002 | Hede et al. | |
| 6,505,265 B1 | * | 1/2003 | Ishikawa et al. | ............. 710/113 |
| 7,093,047 B2 | * | 8/2006 | Au et al. | ...................... 710/243 |
| 2001/0005869 A1 | * | 6/2001 | Yamada et al. | ............. 710/107 |
| 2001/0042178 A1 | | 11/2001 | Achilles et al. | |
| 2004/0177188 A1 | | 9/2004 | Yoon | |

OTHER PUBLICATIONS

Round-Robin Arbiter Design and Generation, Shin et al., 2002.*

* cited by examiner

*Primary Examiner*—Khanh Dang
(74) *Attorney, Agent, or Firm*—Westman, Champlin & Kelly, P.A.

(57) ABSTRACT

An arbitration device is provided, which is designed to be connected between, on the one hand, a first and a second module and, on the other hand, storing means forming a memory workspace. This arbitration device includes a detector for detecting one or more requests coming, concurrently or not, from the first and second modules, for the purpose of accessing the memory workspace.

15 Claims, 7 Drawing Sheets

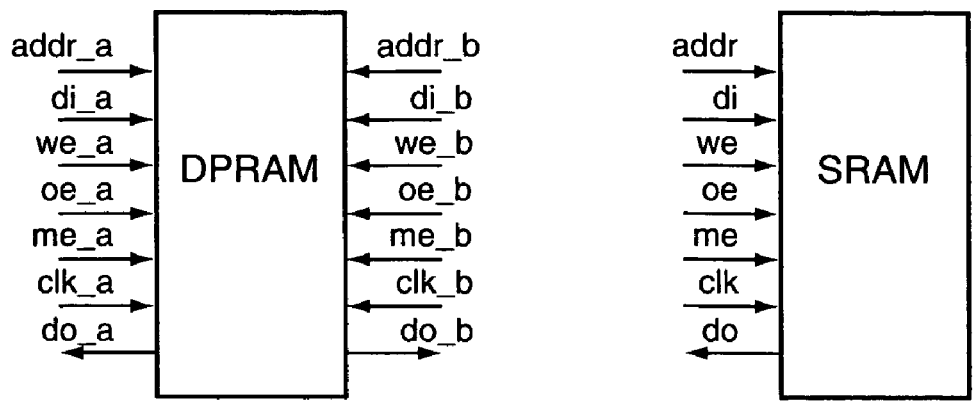
Fig. 1                      Fig. 2
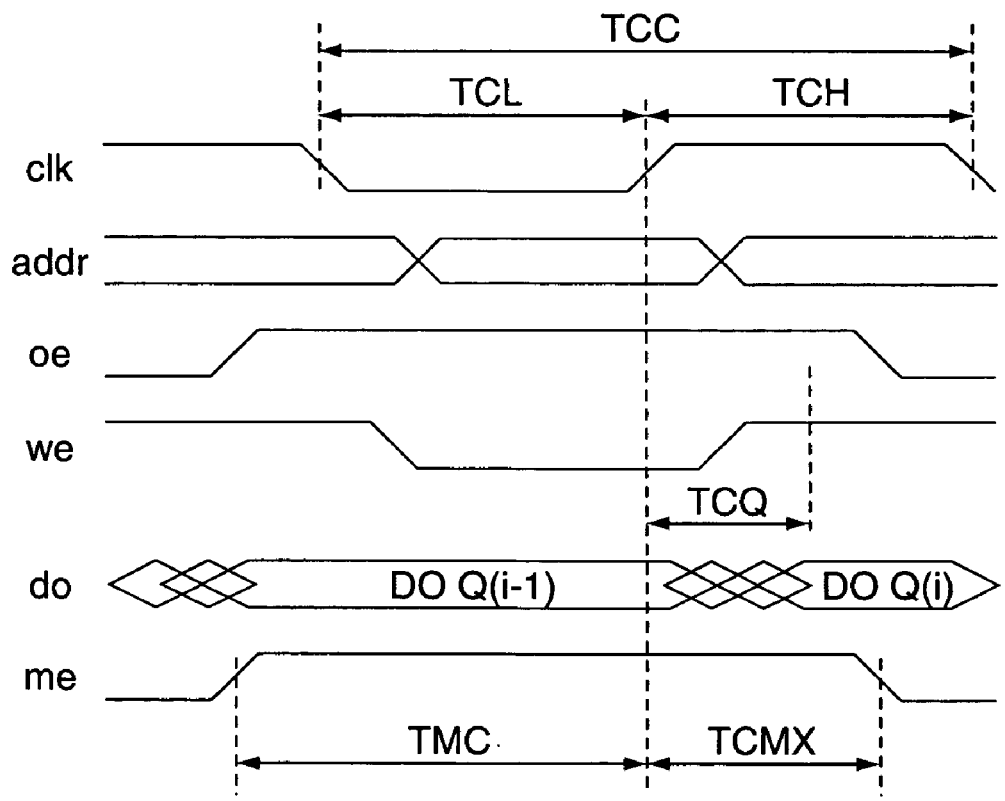
Fig. 3

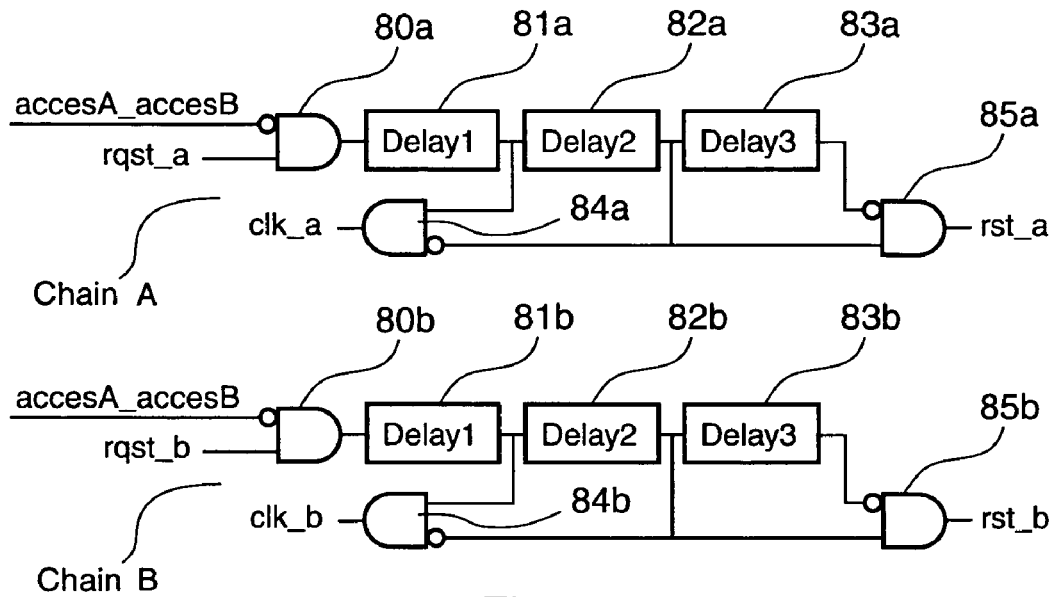
Fig. 8
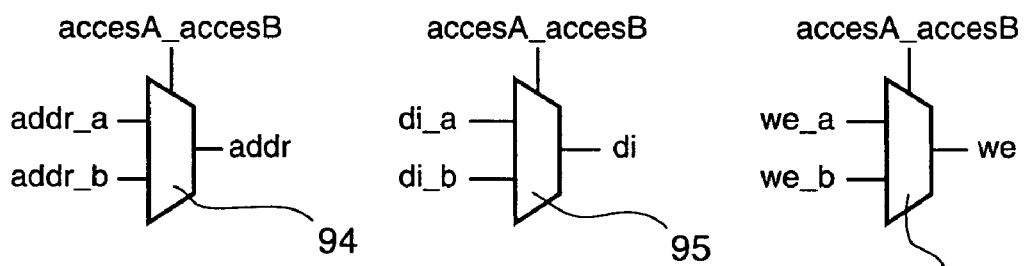
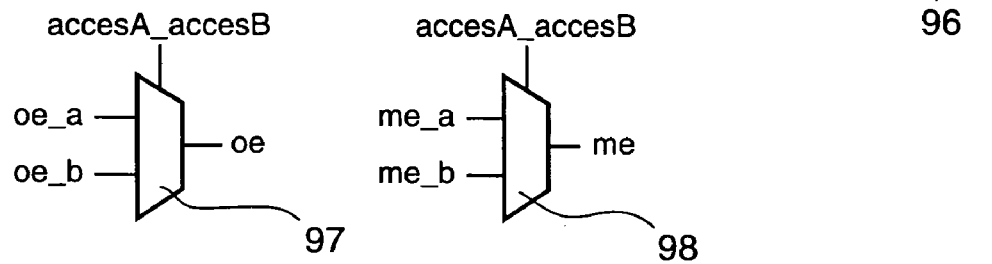
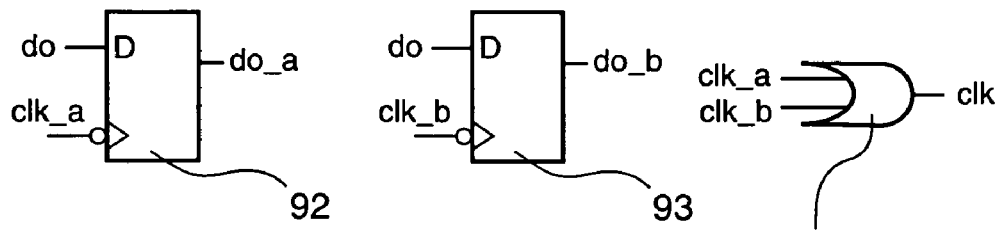
Fig. 9

ASYNCHRONOUS ARBITRATION DEVICE AND MICROCONTROLLER COMPRISING SUCH AN ARBITRATION DEVICE

CROSS-REFERENCE TO RELATED APPLICATION

None.

FIELD OF THE INVENTION

The field of the disclosure is that of electronic circuits. More precisely, the disclosure relates to an arbitration device, designed to be connected between, on the one hand, a first and a second module and, on the other hand, storing means forming a memory workspace.

BACKGROUND OF THE INVENTION

In the above-mentioned context, where two modules write/read in the same memory workspace, two separate techniques are currently known.

A first known technique consists in utilizing a DPRAM memory. This first known technique is practically necessary when the first and second modules are, respectively, a very fast processing unit (CPU) and a very fast controller (IP block), such as a USB controller, for example. In these cases, the CPU accesses and the controller accesses (e.g., USB) are served concurrently, without waiting.

A second known technique consists in utilizing an SRAM memory with a "cycle-stealing" mechanism (also called a wait mechanism). This second known technique is more suited to the case where the first and second modules are, respectively, a processing unit (CPU) and a slower controller (IP block), such as a CAN controller, for example. When concurrent accesses are detected, the wait mechanism is implemented (sending of a "wait" signal by the SRAM memory or by an arbitration device placed between the SRAM memory and the first and second modules), in order to make either the CPU or the controller wait during the entire duration of a clock cycle of the SRAM memory. Conventionally, the clock of the SRAM memory is expressed either in the time base of the first module (e.g., the CPU), or in that of the second module (e.g., a controller). In other words, the clock signal received at the input of the SRAM memory comes from the first or from the second module.

The aforesaid two known techniques have advantages and disadvantages.

The DPRAM are admittedly very efficient, because there are no conflicts in the event of concurrent access. Their major disadvantage is size (nearly twice that of an SRAM memory with an equivalent capacity) and, above all, heavy technological dependency. It is still actually possible to find technologies that do not propose DPRAM.

The advantage of the SRAM is their smaller size in relation to the DPRAM and, above all, there is definitely not any technological dependency. Their disadvantage is the fact that they impose a wait time either on the CPU or the controller, in order that concurrent accesses might be served. Moreover, if a wait mechanism has not been anticipated, the frequency must be doubled in order to be able to serve two requests, with consequences affecting the system's consumption.

It is pointed out that, in an alternative to the second technique, the memory workspace is produced in the form of a register instead of an SRAM memory. The advantages and disadvantages of this alternative are substantially the same as those of the second known technique (with SRAM memory).

SUMMARY OF THE INVENTION

An embodiment of the invention is directed to an arbitration device, designed to be connected between, on the one hand, a first and a second module and, on the other hand, storing means forming a memory workspace. According to the invention, the arbitration device includes:

means of detecting one or more requests coming, concurrently or not, from the first and second modules, for the purpose of accessing the memory workspace;

selection means generating a selection signal (accesA_accesB) assuming:
  a first state, by default or if a single detected request comes from the first module or else if two requests are detected concurrently;
  a second state, if a single detected request comes from the second module or if one of two concurrently detected requests has already been served;

first clock means, activated if the selection signal assumes the first state, and generating a first clock signal (clk_a) enabling the storing means to serve a request coming from the first module;

first reset means, activated if the selection signal assumes the first state, and generating a first reset signal (rst_a) making it possible to erase a request coming from the first module after it has been served;

second clock means, activated if the selection signal assumes the second state, and generating a second clock signal (clk_b) enabling the storing means to serve a request coming from the second module;

second reset means, activated if the selection signal assumes the second state, and generating a second reset signal (rst_b), making it possible to erase a request coming from the second module after it has been served.

Therefore, an embodiment provides an arbitration device that generates its own clock signal (aforesaid first or second clock signal) for each request coming from the first or second module. In this way, the technique of an embodiment of the invention can be utilized in a synchronous system (case in which the first and second blocks each provide a clock signal) as well as in an asynchronous system (case where the first and second blocks do not provide a clock signal).

Furthermore, the arbitration device according to an embodiment of the invention generates first and second reset signals making it possible to optimally manage two concurrent requests. As a matter of fact, one of the two concurrent requests is served and then erased so that the other request might be served and erased in its turn. It is important to point out that the arbitration device according to an embodiment of the invention finctions asynchronously, which makes it possible to successively process the two requests received concurrently, without waiting for a new clock cycle of the SRAM memory (contrary to the wait mechanism of the prior art, described above). As already indicated above, it is recalled that the clock signal received at the input of the SRAM memory comes from the first or the second module.

It shall be pointed out that the arbitration device according to an embodiment of the invention is generic. It is not dedicated solely to the applications designed for DPRAM memories. It can be used in any application where two modules must access, concurrently or not, the same memory workspace.

Advantageously, the storing means include at least one SRAM memory.

According to one advantageous alternative, the storing means include at least one register.

Preferably, the detection means include:
- a first D flip-flop, whose clock input receives a write enable signal (we_a) coming from the first module;
- a second D flip-flop, whose clock input receives a read signal (rd_a) coming from the first module, or obtained by combining an output enable signal (oe_a) and a memory enable signal (me_a) coming from the first module;
- a third D flip-flop, whose clock input receives a write enable signal (we_b) coming from the second module;
- a fourth D flip-flop, whose clock input receives a read signal (rd_b) coming from the second module, or obtained by combining an output enable signal (oe_b) and a memory enable signal (me_b) coming from the second module.

Furthermore, the first reset signal (rst_a) makes it possible to reset the first and second flip-flops, and the second reset signal (rst_b) makes it possible to reset the third and fourth flip-flops.

Preferably, each of the first, second, third and fourth flip-flops has a D input in the "1" state and a non-inverted output whose initial state is "0", or has a D input in the "0" state and an inverted output whose initial state after inversion is "0". Furthermore, the selection means include:
- a first OR element, receiving at its input the output signals of the first and second flip-flops;
- a second OR element, receiving at its input the output signals of the third and fourth flip-flops;
- a first AND element of which an inverted input receives the output signal of the first OR element and a non-inverted input receives the output signal of the second OR element;
- a fifth D flip-flop, whose clock input receives the output signal of the first AND element, and which has a D input in the "1" state and a non-inverted output whose initial state is "0", or has a D input in the "0" state and an inverted output whose initial state after inversion is "0", the output signal of the fifth flip-flop consisting of said selection signal (accesA_accesB) whose first and second states are "0" and "1", respectively.

Furthermore, the second reset signal (rst_b) makes it possible to reset the fifth flip-flop.

Advantageously, the first, and respectively second clock means include:
- a filtering element which, on condition that the selection signal (accesA_accesB) assumes the first, and respectively second state, allows passage of a request signal (rqst_a, rqst_b) assuming the "1" state, in order to indicate that a request coming from the first, and respectively second module has been detected;
- a first delay element, receiving at its input the output signal of the filtering element;
- a second delay element, receiving at its input the output signal of the first delay element;
- a second AND element of which an inverted input receives the output signal of the second delay element and a non-inverted input receives the output signal of the first delay element, and generating at its output said first, and respectively second clock signal (clk_a, clk_b).

According to one advantageous characteristic, the first, and respectively second reset means share said filtering element and said first and second delay elements with the first, and respectively second clock means. The first, and respectively second reset means further include:
- a third delay element, receiving at its input the output signal of the second delay element;
- a third AND element of which an inverted input receives the output signal of the third delay element and a non-inverted input receives the output signal of the second delay element, and generating at its output said first, and respectively second reset signal (rst_a, rst_b).

Preferably, the first and second delay elements together apply a total cumulative delay greater than or equal to the minimum clock period (TCC) with which the storing means can function.

Preferably, the second delay element applies a delay greater than or equal to the hold time TCQ with which the storing means can function.

Advantageously, the arbitration device further includes a third OR element, that receives in input the first and second clock signals (clk_a, clk_b) and generates a third clock signal (clk) at output for the storing means.

Advantageously, the arbitration device further includes:
- a sixth D flip-flop, whose D input is designed to receive a first output data signal (do) coming from the storing means, and whose clock input receives the first clock signal (clk_a), and which generates at its output a second output data signal (do_a) intended for the first module;
- a seventh D flip-flop, whose D input is designed to receive said first output data signal (do) coming from the storing means, and whose clock input receives the second clock signal (clk_b), and which generates at its output a third output data signal (do_b) intended for the second module.

Advantageously, the arbitration device further includes at least one multiplexing means, each multiplexing means being such that:
- it makes it possible to provide a separate control signal to the storing means;
- it receives at its input a first control signal coming from the first module and a second control signal coming from the second module;
- it is controlled by said selection signal (accesA_accesB) with the result being that:
- if the selection signal assumes the first state, the multiplexing means generates at its output said first control signal;
- if the selection signal assumes the second state, the multiplexing means generates at its output the second control signal;

Advantageously, said control signal belongs to the group comprising: an address signal (addr), an input data signal (di), a write enable signal (we), an output enable signal (oe), a memory enable signal (me) and a read signal (rd).

In one particular embodiment of the invention, the first and second modules are a processing unit (CPU) and an IP block of a microcontroller, respectively.

An embodiment of the invention also relates to a microcontroller comprising an arbitration device according to the invention, as mentioned above.

Other characteristics and advantages of one or more embodiments of the invention will become apparent upon reading the following description, given by way of an illustrative and non-limiting example, and of the appended drawings.

BRIEF DESCRIPTION OF THE DRAWINGS

FIG. 1 shows the input/output signals of a DPRAM memory known in the prior art;

FIG. 2 shows the input/output signals of an SPRAM memory known in the prior art;

FIG. 3 shows the timing charts of the input/output signals of an SPRAM memory, during a read access, according to the prior art;

FIG. 8 shows a hardware implementation diagram of a particular embodiment of a second part of the arbitration device according to an embodiment of the invention, in the context of FIG. 5;

FIG. 9 shows a hardware implementation diagram of a particular embodiment of a third part of the arbitration device according to an embodiment of the invention, in the context of FIG. 5;

DETAILED DESCRIPTION OF ILLUSTRATIVE EMBODIMENTS

In all of the figures of this document, identical elements are designated by the same numerical reference.

Thus, an embodiment of the invention relates to an arbitration device (also called an arbiter), designed to be connected between, on the one hand, a first and a second module and, on the other hand, storing means forming a memory workspace.

Before presenting in detail one particular embodiment of the arbitration device according to an embodiment of the invention, some concepts relating to DPRAM and SRAM memories will first be recalled.

DPRAM, like SRAM, perform the read/write operations in a synchronous manner. Thus, all requests are taken into account only on the rising edge of the clock. For the DPRAM, there is a clock on each side, thus accesses occur independently.

FIG. 1 shows the input/output signals of a DPRAM and FIG. 2 those of an SRAM. The nature and role of each of these signals is recalled briefly herein below.

The output data signal (also called the "Data output bus", or output bus) is referenced as do_a and do_b in FIG. 1 and do in FIG. 2. This output bus is controlled by the "Output enable" signal (oe_a, oe_b or oe). When the "Output enable" signal is at 1, the value of the memory of the address specified by the address bus (addr_a, addr_b or addr), is found on the output bus. When the "Output enable" signal is at 0, the output bus (data output bus) is floating (high impedance).

The output enable signal (also called "Output Enable") is referenced as oe_a and oe_b in FIG. 1 and oe in FIG. 2. When this signal is at 1, the data on the output bus is that read in the memory.

The address signal (also called address bus) is referenced as addr_a and addr_b in FIG. 1 and addr in FIG. 2. It is used to address the location to be written or read during the read/write cycles.

The input data signal (also called "Data Input bus" or input bus) is referenced as di_a and di_b in FIG. 1 and di in FIG. 2. It is used to write data to the address specified by the address bus.

The memory enable signal (also called "Memory Enable") is referenced as me_a and me_b in FIG. 1 and me in FIG. 2. When this signal is at 1, the memory is active and write/read accesses can be performed.

The write enable signal (also called "Write Enable") is referenced as we_a and we_b in FIG. 1 and we in FIG. 2. When it is at 1 and when the memory is activated (me at 1), a write operation is involved. When it is at 0 and when the memory is activated (me at 1), a read operation is involved.

The clock signal (also called "Clock") is referenced as clk_a and clk_b in FIG. 1 and clk in FIG. 2. This is the memory clock. Accesses are performed on the rising edge of this clock.

Figure 4:
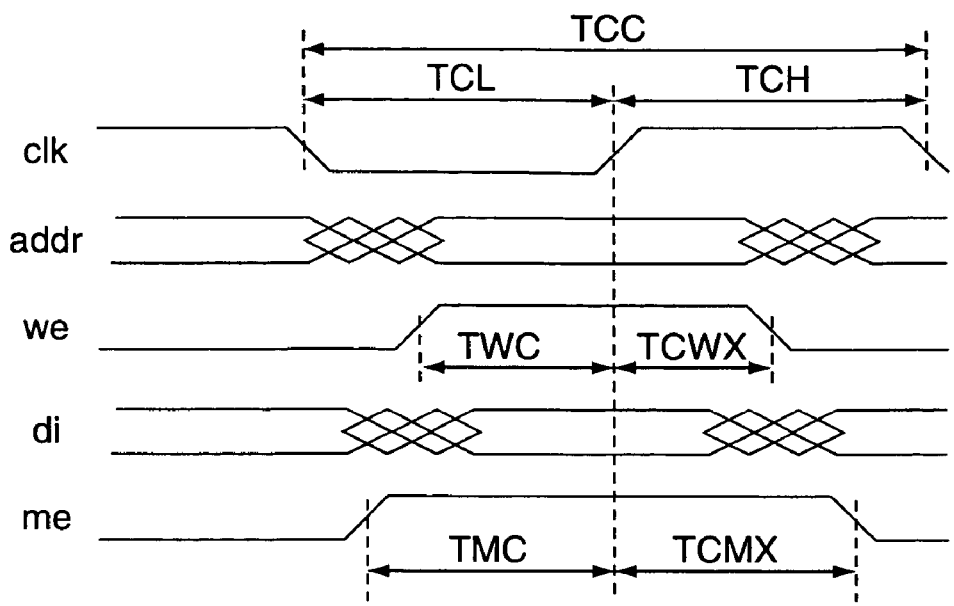
FIG. 4 shows the timing charts of the input/output signals of an SPRAM memory, during a write access, according to the prior art.

FIG. 3 shows the timing charts of the input/output signals of an SPRAM memory, during a read access. FIG. 4 shows the timing charts of the input/output signals of an SPRAM memory, during a write access. These timing charts are well known by those skilled in the art and are therefore not described in this disclosure.

Figure 5:
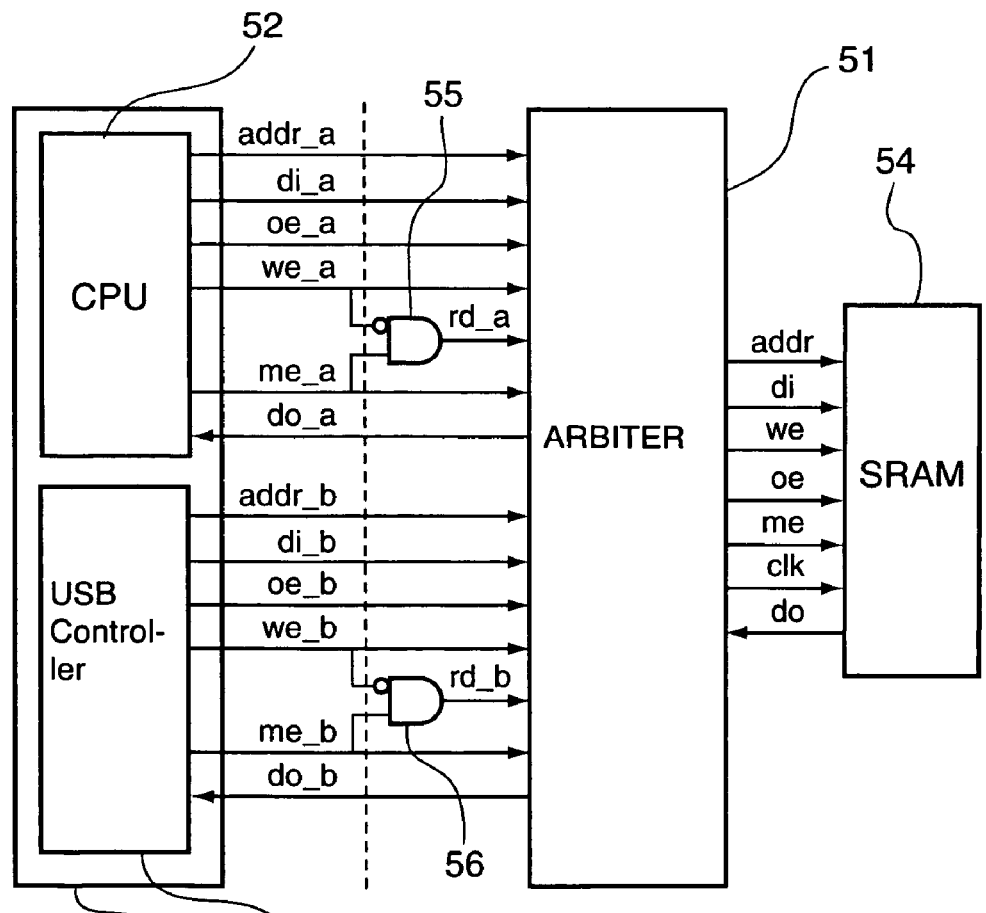
FIG. 5 shows a block diagram of a first particular embodiment of the invention, wherein the arbitration device makes it possible to interface two modules with an SRAM memory.

FIG. 5 shows a first particular embodiment of the invention, wherein an arbitration device 51 makes it possible to interface a first module 52 ("side A") and a second module 53 ("side B") with an SRAM memory 54. The first and second modules, for example, are the CPU and an IP block (e.g., a USB controller), respectively, of a microcontroller 57.

On "side A", an AND element referenced as 55 has in inverted input that receives the signal we_a and a non-inverted input that receives the signal me_a. It makes it possible to generate a read signal rd_a. In the same way, on "side B", an AND element referenced as 56 has an inverted input that receives the signal we_b and a non-inverted input that receives the signal me_b. It makes it possible to generate a read signal rd_b.

Figure 6:
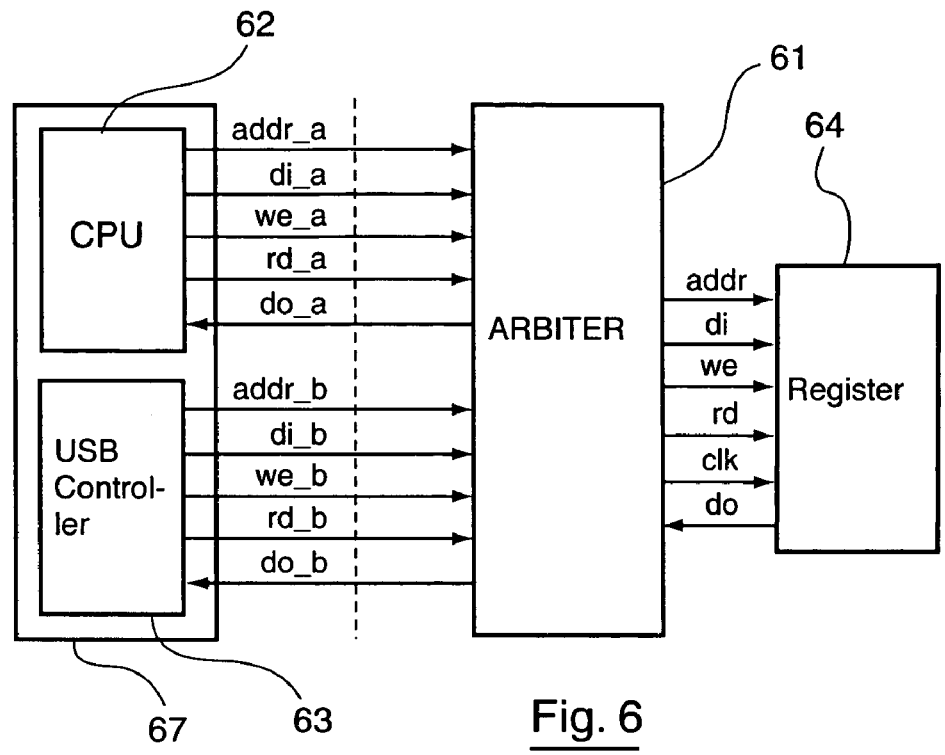
FIG. 6 shows a block diagram of a particular second embodiment of the invention, wherein the arbitration device makes it possible to interface two modules with a register.

FIG. 6 shows a second particular embodiment of the invention, wherein an arbitration device 61 makes it possible to interface a first module 62 ("side A") and a second module 63 ("side B") with a register 64. The register, for example, is made in the form of a digital D flip-flop. The first and second modules, for example, are the CPU and an IP block (e.g., a USB controller), respectively, of a microcontroller 67.

It shall be pointed out that each of the modules 62, 63 directly generate a read signal rd_a, rd_b.

In the remainder of the description, an exemplary embodiment of the arbitration device according to an embodiment of the invention is presented, wherein it includes three parts:
- a first part (see FIG. 7) making it possible to detect the write/read requests and to generate the selection signal accesA_accesB used to choose between a request coming from side A, or else a request coming from side B;
- a second part (see FIG. 8) making it possible to generate the clock required to perform an access in the SRAM, as well as the reset signals for erasing the write/read request once the latter has been served; and
- a third part (see FIGS. 9 and 10) that makes it possible to multiplex the signals coming from the two modules accessing the same SRAM, in order to generate the control signals for the SRAM (me, oe, addr, di, do, etc).

Figure 7:
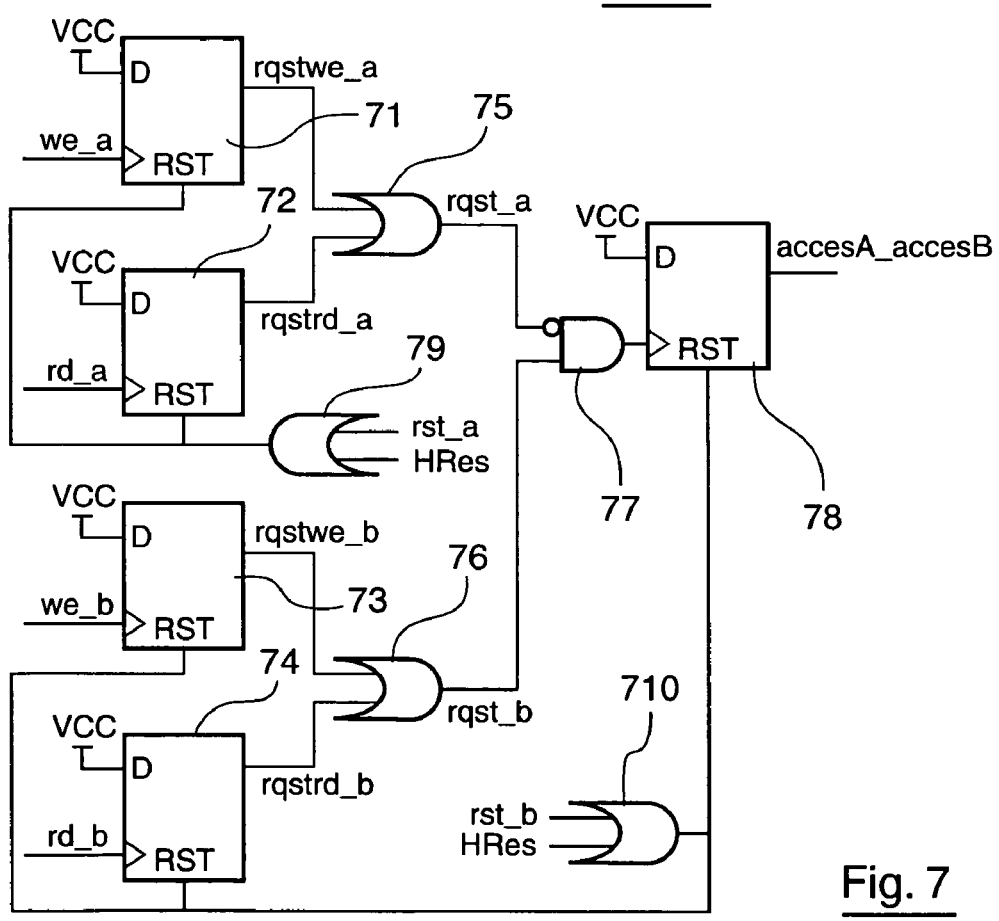
FIG. 7 shows a hardware implementation diagram of a particular embodiment of a first part of the arbitration device according to an embodiment of the invention, in the context of FIG. 5.

A particular embodiment of the first part of the arbitration device 51 according to an embodiment of the invention, in the context of FIG. 5 (i.e., when the memory workspace is constructed with an SRAM), will now be presented, in relation to FIG. 7.

This first part includes:
- a D flip-flop referenced as 71, whose clock input receives the signal we_a coming from the first module 52;
- a D flip-flop referenced as 72, whose clock input receives the signal rd_a obtained by combining the signals oe_a and me_a coming from the first module 52;
- a D flip-flop referenced as 73, whose clock input receives the signal we_b coming from the second module 53;
- a D flip-flop referenced as 74, whose clock input receives the signal rd_b obtained by combining the signals oe_b and me_b coming from the second module 53;
- an OR element referenced as 75, receiving at its input the output signals rqstwe_a and rqstrd_a of the flip-flops referenced as 71 and 72;
- an OR element referenced as 76, receiving at its input the output signals rqstwe_b and rqstrd_b of the flip-flops referenced as 73 and 74;
- an AND element referenced as 77, of which an inverted input receives the output signal rqst_a of the OR element referenced as 75 and a non-inverted input receives the output signal rqst_b of the OR element referenced as 76;
- a D flip-flop referenced as 78, which has a D input in the "1" state (VCC) and a clock input receiving the output signal of the AND element referenced as 77, and which generates an output signal accesA_accesB whose initial state is "0" and that is subsequently called the selection signal;
- an OR element referenced as 79, receiving at its input a first reset signal rst_a (see FIG. 8) and a hardware reset signal HRes (also called "hardware reset"), and generating a signal making it possible to reset the flip-flops referenced as 71 and 72;
- an OR element referenced as 710, receiving at its input a second reset signal rst_b (see FIG. 8) and the hardware reset signal HRes, and generating a signal making it possible to reset the flip-flops referenced as 73, 74 and 78.

Each of the flip-flops referenced as 71 to 74 has a D input in the "1" state and an output whose initial state is "0".

The operation of this first part will now be detailed. First of all, the system is initialized by the hardware reset signal: HRes=1. The output of each of the flip-flops referenced as 71 to 74 and 78 will be set to 0. Thus, the signal accesA_accesB is at 0 by default, which indicates that, by default, the access will be given to the first module 52 ("side A").

If a read/write request arrives (we_a, rd_a, we_b, or re_b is at 1), this request is stored by the signal rqstwe_a, rqstrd_a, rqstwe_b, or rqstrd_b. These signals will be erased when a rst_a, respectively rst_b is at on. We will later see that these two signals can be generated only at the end of the access underway.

If a request arrives on side A (we_a or rd_a is at 1), it is stored by one of the signals rqstwe_a or rqstrd_a which shifts to 1. The signal rqst_a will shift to 1. The AND element referenced as 77 will not allow this signal to pass, because its input is inverted. Thus, the clock input of the flip-flop referenced as 78 always remains at 0. The signal accesA_accesB always remains at 0, which corresponds to a selection of the access A. If the signal rst_a is at 1, the outputs rqstwe_a and rqstrd_a of the two corresponding flip-flops, referenced as 71 and 72, are erased. The AND element referenced as 77 will allow the signal rqst_b to pass.

If a new request arrives on side A, the operating steps described above are executed again.

If a request arrives on side B (we_b or rd_b is at 1), it is stored by one of the signals rqstwe_b or rqstrd_b which shifts to 1. The signal rqst_b will shift to 1. Since the AND element referenced as 77 allows this signal to pass, then on the clock input of the flip-flop referenced as 78, there will be an edge that will shift the signal accesA_accesB to 1. This shifting results in the selection of side B in order to perform an access in the SRAM 54. If the signal rst_b is at 1, the outputs rqstwe_b and rqstrd_b of the two corresponding flip-flops, referenced as 73 and 74, are erased. In the same way, the signal accesA_accesB is erased.

It may thus be noted that this solution implements the concept of priority. If concurrent requests are carried out on side A and B, the priority is given to side A. When this access is completed, the next access served will be that coming from side B.

In the aforesaid example of use, where the first module is the CPU, it was thus assumed that the CPU must have had more priority than the USB controller (IP block) since it performs the A-type accesses (connection to side A of the arbiter). It is clear that, if in other applications, the CPU is to have less priority, it suffices to assign it the role of the second module 53, so that it might perform the B-type accesses (connection to side B of the arbiter). In this case, the USB controller would be the first module and would perform A-type accesses.

A particular embodiment of the second part of the arbitration device 51 according to an embodiment of the invention, in the context of FIG. 5 (i.e., when the memory workspace is constructed with an SRAM), will now be presented in relation to FIG. 8.

This second part includes two chains, referred to below as chain A and chain B.

Chain A includes:
- an AND element referenced as 80a, of which an inverted input receives the selection signal accesA_accesB and a non-inverted input receives the output signal rqst_a of the OR element referenced as 75 in FIG. 7;
- a first delay element (also called "delay1") 81a, receiving at its input the output signal of the AND element referenced as 80a;
- a second delay element (also called "delay2") 82a, receiving at its input the output signal of the first delay element 81a;
- an AND element referenced as 84a, of which an inverted input receives the output signal of the second delay element 82a and a non-inverted input receives the output signal of the first delay element 81a, and generating at its output a first clock signal clk_a;

a third delay element (also called "delay3") 83a, receiving at its input the output signal of the second delay element 82a;

an AND element referenced as 85a, of which an inverted input receives the output signal of the third delay element 83a and a non-inverted input receives the output signal of the second delay element 82a, and generating at its output the first reset signal rst_a.

Chain B includes:

an AND element referenced as 80b, of which an inverted input receives the selection signal accesA_accesB and a non-inverted input receives the output signal rqst_b of the OR element referenced as 76 in FIG. 7;

a first delay element (also called "delay1") 81b, receiving at its input the output signal of the AND element referenced as 80b;

a second delay element (also called "delay2") 82b, receiving at its input the output signal of the first delay element 81b;

an AND element referenced as 84b, of which an inverted input receives the output signal of the second delay element 82b and a non-inverted input receives the output signal of the first delay element 81b, and generating at its output a second clock signal clk_b;

a third delay element(also called "delay3")83b, receiving at its input the output signal of the second delay element 82b;

an AND element referenced as 85b, of which an inverted input receives the output signal of the third delay element 83b and a non-inverted input receives the output signal of the second delay element 82b, and generating at its output the second reset signal rst_b.

The second part of the arbitration device 51 has the function of generating two clock signals (clk_a, clk_b, the combination of which (see FIGS. 9 and 10) produces the clock clk for the SRAM 54), as well as generating the reset signals (rst_a, rst_b), when the access is complete.

It shall be pointed out that, at a given moment, only one of the two chains can be executed. As a matter of fact, when the side A access is chosen (accesA_accesB=0), the AND element referenced as 80a allows the request from side A to pass, whereas the AND element referenced as 80b will block the request from side B.

Only one of the two chains is described, the other having a similar operation. Reference must be made to FIGS. 3 and 4 in order to understand the choice of the various delay elements.

The first delay element ("delay1") applies a delay DELAY1 making it possible to observe the time TCL of the SRAM clock (low clock phase (LOW)). Thus: DELAY1≧TCL.

The second delay element ("delay2") applies a delay DELAY2 making it possible to observe the time TCQ ("hold time" of the SRAM memory). Thus: DELAY2≧TCQ. This time is generally longer than the TCC (minimum clock period), thus, the TCC, as well as the TCH, are closely observed.

The first and second delay elements together apply a total cumulative delay greater than or equal to the minimum clock period TCC with which the SRAM can operate. Thus: DELAY1+DELAY2≧TCC.

For example: DELAY1=1 ns and DELAY2=6 ns, in the case where TCC=7 ns and TCQ=3 ns.

The third delay element ("delay3") applies a DELAY3 making it possible to generate a reset pulse, which erases the read/write request previously carried out. For easier hardware implementation, the third delay element can be the same as the first delay element.

Figure 11:
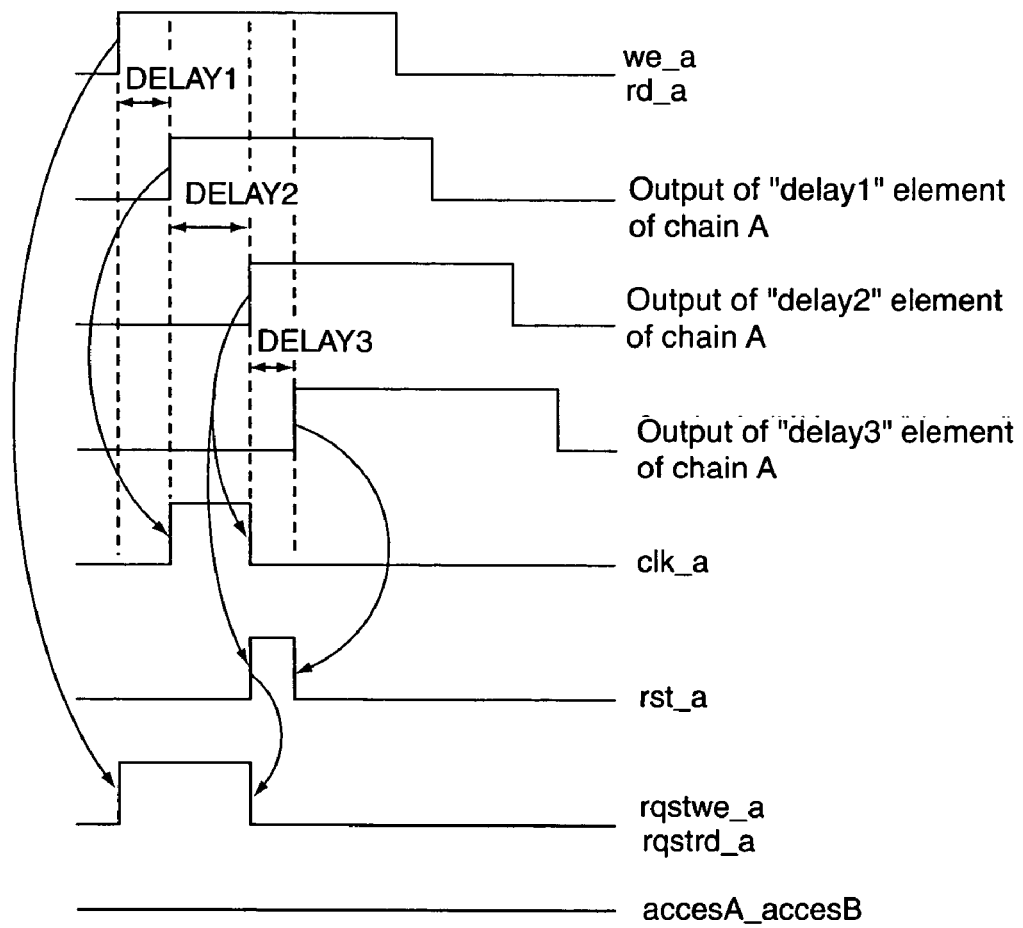
FIG. 11 shows timing charts of signals showing the processing of a request coming from a first module, by means of the arbitration device according to an embodiment of the invention, in the context of FIG. 5.

FIG. 11 shows timing charts of signals showing the processing of a request coming from "side A", i.e., from the first module 52, by means of the arbitration device according to an embodiment of the invention, in the context of FIG. 5. As desired, the first clock signal clk_a and the first reset signal rst_a each have a pulse. The duration of the access is: DELAY1+DELAY2.

Figure 12:
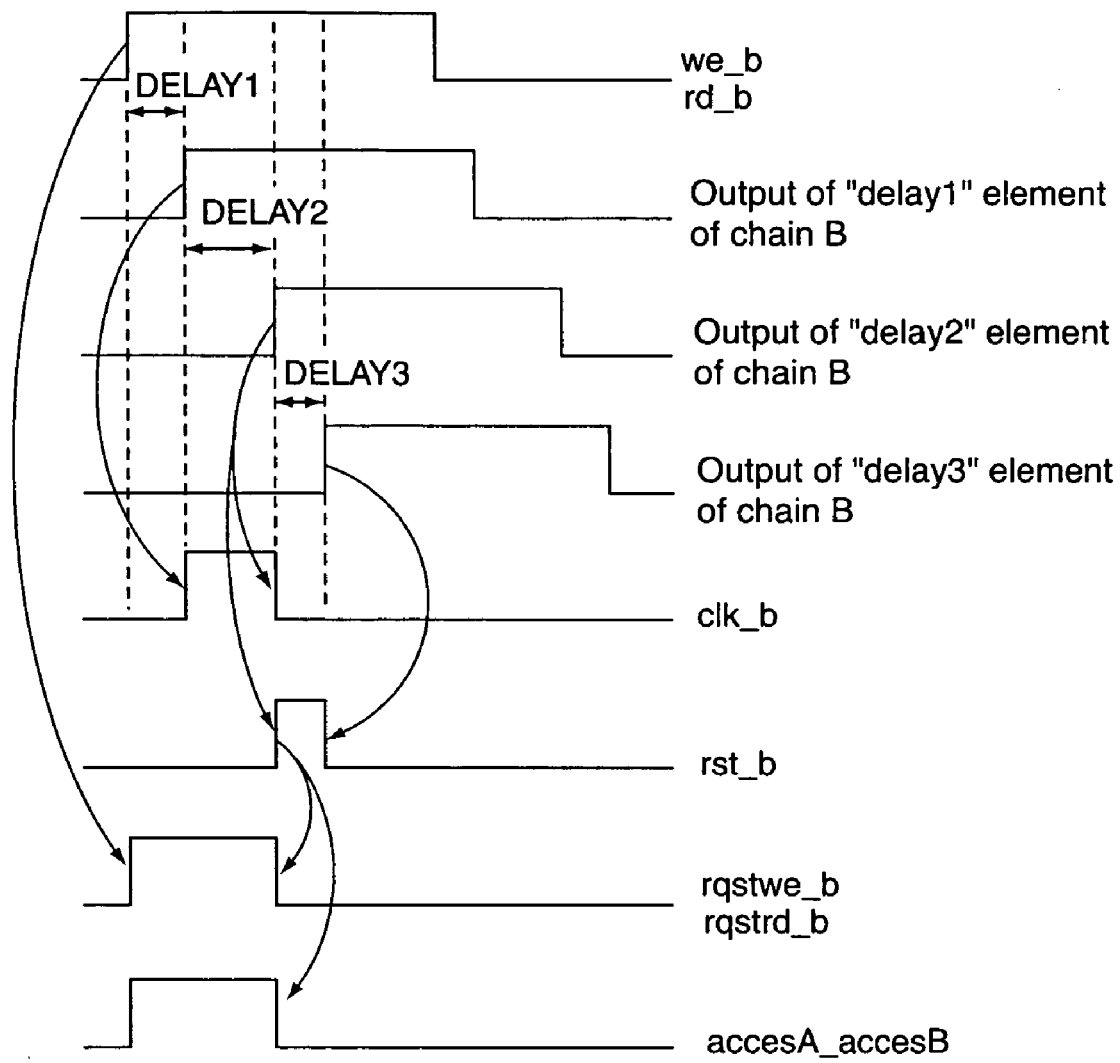
FIG. 12 shows timing charts of signals showing the processing of a request coming from a second module, by means of the arbitration device according to an embodiment of the invention, in the context of FIG. 5.

FIG. 12 shows timing charts of signals showing the processing of a request coming from "side B", i.e., from the second module 53, by means of the arbitration device according to an embodiment of the invention, in the context of FIG. 5. As desired, the second clock signal clk_b and the second reset signal rst_b each have a pulse. The duration of the access is: DELAY1+DELAY2.

Figure 13:
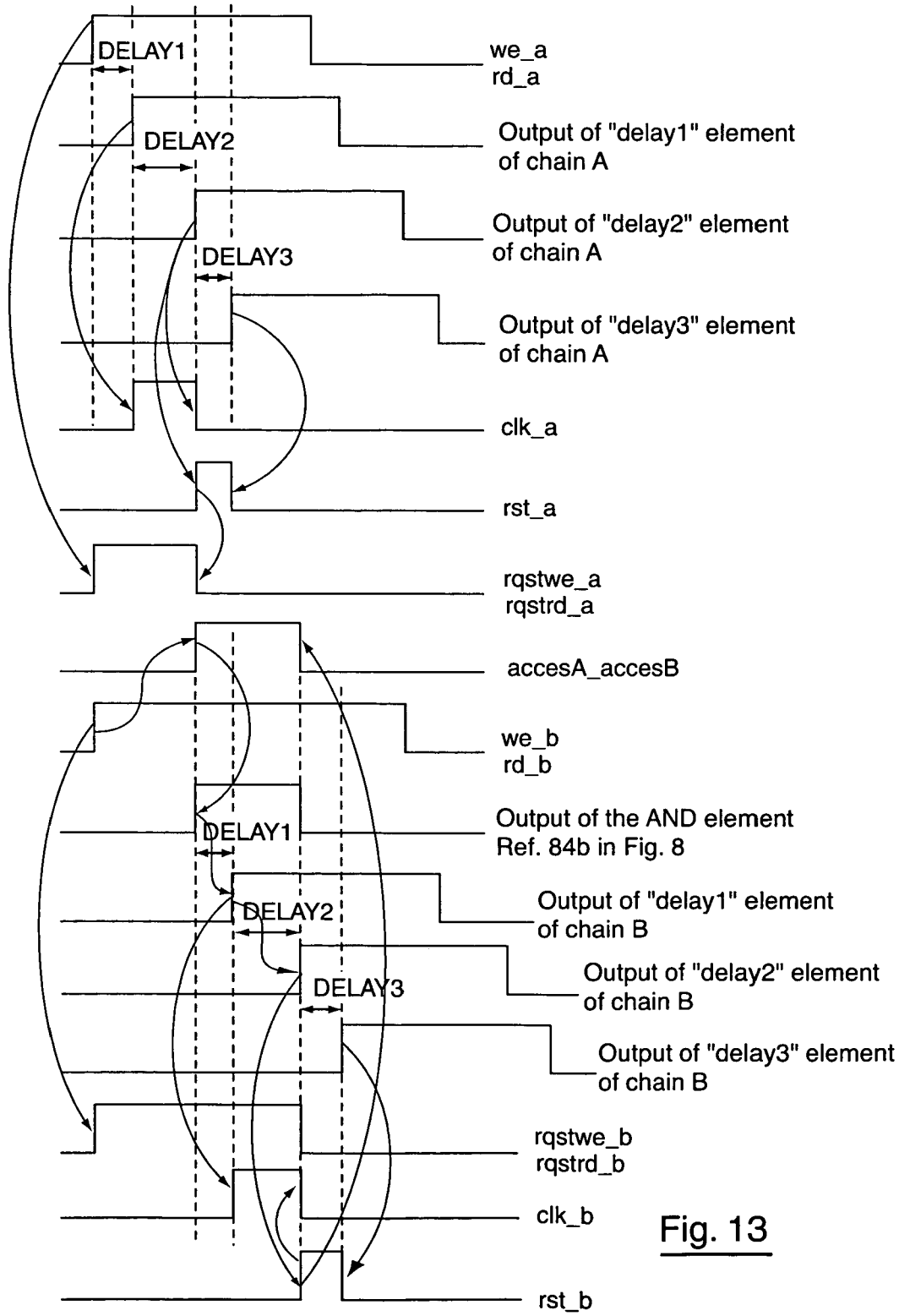
FIG. 13 shows timing charts of signals showing the processing of two concurrent requests coming from the first and second modules, by means of the arbitration device according to an embodiment of the invention, in the context of FIG. 5.

FIG. 13 shows timing charts of signals showing the processing of two concurrent requests coming from "sides A and B", i.e., from the first and second modules 52, 53, by means of the arbitration device according to an embodiment of the invention, in the context of FIG. 5. As desired, the first clock signal clk_a and the first reset signal rst_a each have a pulse, defining a first access duration (DELAY1+DELAY2), then the second clock signal clk_b and the second reset signal rst_b each have a pulse, defining a second access duration (DELAY1+DELAY2).

A particular embodiment of the third part of the arbitration device 51 according to an embodiment of the invention, in the context of FIG. 5 (i.e., when the memory workspace is constructed with an SRAM), will now be presented in relation to FIG. 9.

This third part is responsible for generating the control signals for the SRAM. It includes three subparts.

A first subpart includes an OR element referenced as 91, receiving at its input the first and second clock signals clk_a and clk_b (see FIG. 8), and generating at its output the clock signal clk for the SRAM 54 (see FIG. 5).

It shall be pointed out that, in one alternative, the OR element referenced as 91 can be replaced by a multiplexer. However, this alternative is less performing because, on the one hand, the propagation time is longer and, on the other hand, because the signals clk_a and clk_b are generated only when a read/write request arrives and, therefore, there can be no pulses on the signal clk_a or clk_b if there is no request. The OR element solution makes it possible to prevent unwanted writes and to limit memory consumption.

A second subpart includes:

a D flip-flop referenced as 92, whose D input is designed to receive the signal do (output bus) from the SRAM, and whose clock input receives the first clock signal (clk_a). It generates at its output a signal do_a intended for the first module 52;

a D flip-flop referenced as 93, whose D input is designed to receive the signal do (output bus) from the SRAM, and whose clock input receives the second clock signal clk_b. It generates at its output a signal do_b intended for the second module 53.

These flip-flops referenced as 92 and 93 make it possible to save the read data in the SRAM 54. Their use is required. As previously described, the read data is held on the output bus (do) of the SRAM as long as the SRAM is active (me=1). In this case, when the access is completed, the SRAM is deactivated in order to limit consumption. Without a flip-flop, the read data would thus be lost at the end of the signals rd_a or rd_b. Such being the case, it is exactly at that moment that this data will be taken into account by the modules that initiated the read request. Therefore, this is the reason why a flip-flop (or more precisely a bank of registers) is added to the output of the SRAM. There is a bank of registers for side A and one for side B. The clock width clk_a and clk_b (DELAY2) has been suitably selected to observe the hold time TCQ of the SRAM. Thus, on the falling edge of these clocks, the data on the output bus (do) of the SRAM is valid. It is thus possible to use this falling edge to back up this data in the corresponding register. In this way, if an A-type access is in progress, the clk_a is generated. The output data of the SRAM is backed up in the flip-flop do_a on the falling edge of this clock. In the same way, if a B-type access is in progress, the clk_b is generated. The output data of the SRAM is backed up in the flip-flop do_b on the falling edge of this clock.

A third part includes:
- a multiplexer referenced as 94, receiving at its input the signals addr_a and addr_b coming from the first and second modules 52, 53 (see figure 5), and controlled by the selection signal accesA_accesB (see FIG. 7) in order to generate at its output the signal addr for the SRAM 54 (see FIG. 5). If the signal accesA_accesB is at 0, the signal addr_a coming from side A is selected. If the signal accesA_accesB is at 1, the signal addr_b coming from side B is selected;
- a multiplexer referenced as 95, receiving at its input the signals di_a and di_b coming from the first and second modules, and controlled by the selection signal accesA_accesB in order to generate at its output the signal di for the SRAM. Depending on whether the signal accesA_accesB is at 0 or 1, the signal di_a or di_b is selected;
- a multiplexer referenced as 96, receiving at its input the signals we_a and we_b coming from the first and second modules, and controlled by the selection signal accesA_accesB in order to generate at its output the signal we for the SRAM. Depending on whether the signal accesA_accesB is at 0 or 1, the signal we_a or we_b is selected;
- a multiplexer referenced as 97, receiving at its input the signals the signals oe_a and oe_b coming from the first and second modules, and controlled by the selection signal accesA_accesB in order to generate at its output the signal oe for the SRAM. Depending on whether the signal accesA_accesB is at 0 or 1, the signal oe_a or oe_b is selected;
- a multiplexer referenced as 98, receiving at its input the signals the signals me_a and me_b coming from the first and second modules, and controlled by the selection signal accesA_accesB in order to generate at its output the signal me for the SRAM. Depending on whether the signal accesA_accesB is at 0 or 1, the signal me_a or me_b is selected.

Figure 10:
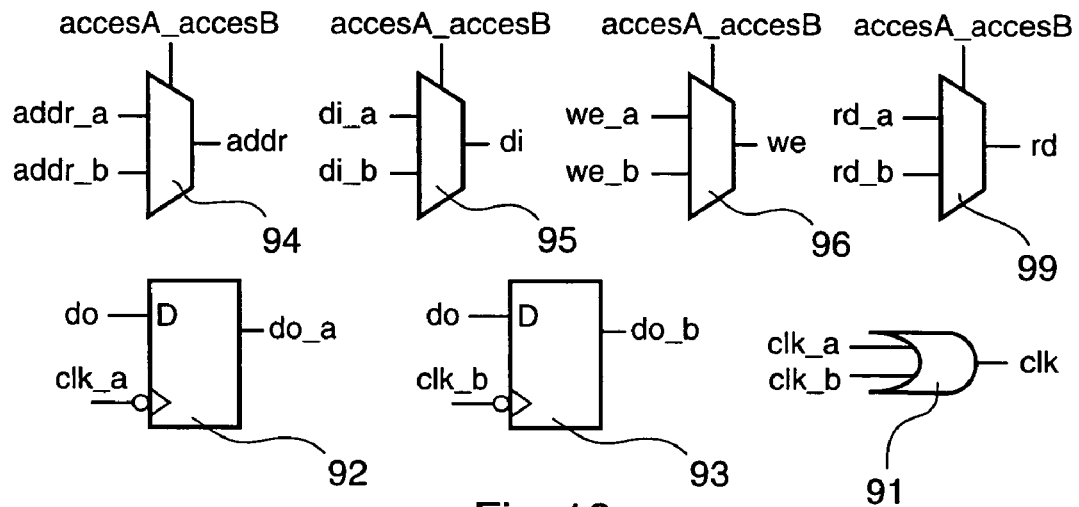
FIG. 10 shows a variant of the diagram of FIG. 9, in the context of FIG. 6.

FIG. 10 shows a variant of the diagram of FIG. 9, in the context of FIG. 6 (i.e., when the memory workspace is constructed with a register).

This alternative differs from the embodiment of FIG. 9 only in that the multiplexers referenced as 97 and 98, generating the signals oe and me, respectively, are replaced by a multiplexer referenced as 99, generating the signal rd (see FIG. 6).

This multiplexer referenced as 99 receives at its input the signals rd_a and rd_b coming from the first and second modules, and is controlled by the selection signal accesA_accesB in order to generate at its output the signal rd for the SRAM. Depending on whether the signal accesA_accesB is at 0 or 1, the signal rd_a or rd_b is selected.

The above disclosure relates to an arbitration device, designed to be connected between, on the one hand, a first and a second module and, on the other hand, storing means forming a memory workspace.

One or more embodiment of the disclosure can be applied in every case where two modules write/read in the same memory workspace.

This memory workspace, for example, is constructed in the form of a synchronous memory of the SRAM type (for "Static RAM") or in the form of a register (e.g., a digital D flip-flop, also called DFF).

An embodiment of the disclosure is applicable in particular, but not exclusively, in the case where the first and second modules are respectively a processing unit (or CPU) and an IP block of a microcontroller.

It is recalled that IP blocks (for "Intellectual Property"), produced in the form of software and/or hardware, are controllers (also called peripherals) integrated into microcontrollers (USB controller for "Universal Serial Bus"), CAN controller (for "Controller Area Network"), etc.

An embodiment applies particularly, but not exclusively, to all implementations that today utilize DPRAM memories (for "dual port RAM"), wherein it is possible to gain access via the two ports concurrently.

One or more embodiments of the invention overcome various disadvantages of the prior art.

More precisely, an embodiment provides an arbitration device making it possible to benefit from the advantages of the SRAM memories (or registers), while at the same time not requiring any wait mechanism of the aforesaid type (wait during the entire duration of a clock cycle) or any doubling of the clock frequency.

An embodiment also provides such an arbitration device which makes it possible to replace a DPRAM memory with a single SRAM memory or a register, the arbitration device choosing between two requests (potentially concurrent) coming from a first module ("side A") or from a second module ("side B"). The idea is to be able to keep a DPRAM interface, i.e, by using the same signals as those used to access a DPRAM memory, generate SRAM-type accesses, i.e.,.

An embodiment provides such an arbitration device capable of being used both in synchronous systems and in asynchronous systems.

An embodiment provides such an arbitration device that is simple to implement and inexpensive.

Although the present invention has been described with reference to preferred embodiments, workers skilled in the art will recognize that changes may be made in form and detail without departing from the spirit and scope of the invention.

What is claimed is:

1. Arbitration device, designed to be connected between, on the one hand, a first and a second module and, on the other hand, storing means forming a memory workspace, the device comprising:
    means of detecting one or more requests coming, concurrently or not, from the first and second modules, for the purpose of accessing the memory workspace;
    selection means generating a selection signal assuming:
        a first state, by default or if a single detected request comes from the first module or else if two requests are detected concurrently; and a second state, if a single detected request comes from the second module or if one of two concurrently detected requests has already been served;

first clock means, activated if the selection signal assumes the first state, and generating a first clock signal enabling the storing means to serve a request coming from the first module;

first reset means, activated if the selection signal assumes the first state, and generating a first reset signal making it possible to erase a request coming from the first module after it has been served;

second clock means, activated if the selection signal assumes the second state, and generating a second clock signal enabling the storing means to serve a request coming from the second module; and second reset means, activated if the selection signal assumes the second state, and generating a second reset signal, making it possible to erase a request coming from the second module after it has been served.

2. The device in claim 1, wherein the storing means include at least one SRAM memory.

3. The device in claim 1, wherein the storing means include at least one register.

4. The device in claim 1, wherein the detection means include:
a first D flip-flop, whose clock input receives a write enable signal coming from the first module;
a second D flip-flop, whose clock input receives a read signal coming from the first module, or obtained by combining an output enable signal and a memory enable signal coming from the first module;
a third D flip-flop, whose clock input receives a write enable signal coming from the second module;
a fourth D flip-flop, whose clock input receives a read signal coming from the second module, or obtained by combining an output enable signal and a memory enable signal coming from the second module;
and wherein the first reset signal makes it possible to reset the first and second flip-flops, and the second reset signal makes it possible to reset the third and fourth flip-flops.

5. The device in claim 4, wherein each of the first, second, third and fourth flip-flops has a D input in the "1" state and a non-inverted output whose initial state is "0", or has a D input in the "0" state and an inverted output whose initial state after inversion is "0", and wherein the selection means include:
a first OR element, receiving at its input the output signals of the first and second flip-flops;
a second OR element, receiving at its input the output signals of the third and fourth flip-flops;
a first AND element of which an inverted output receives the output signal of the first OR element and a non-inverted input receives the output signal of the second OR element; and
a fifth D flip-flop, whose clock input receives the output signal of the first AND element, and which has a D input in the "1" state and a non-inverted output whose initial state is "0" or has a D input in the "0" state and an inverted output whose initial state after inversion is "0", the output signal of the fifth flip-flop being said selection signal whose first and second states are "0" and "1", respectively;
wherein the second reset signal makes it possible to reset the fifth flip-flop.

6. The device in claim 1, wherein the first, and respectively second clock means include:

a filtering element which, on condition that the selection signal assumes the first, and respectively second state, allows passage of a request signal assuming the "1" state, in order to indicate that a request coming from the first, and respectively second module has been detected;
a first delay element, receiving at its input the output signal of the filtering element;
a second delay element, receiving at its input the output signal of the first delay element;
a second AND element of which an inverted input receives the output signal of the second delay element and a non-inverted input receives the output signal of the first delay element, and generating at its output said first, and respectively second clock signal.

7. The device in claim 6, wherein the first, and respectively second reset means share said filtering element and said first and second delay elements with the first, and respectively second clock means, and wherein the first, and respectively second reset means further include:
a third delay element, receiving at its input the output signal of the second delay element; and
a third AND element of which an inverted input receives the output signal of the third delay element and a non-inverted input receives the output signal of the second delay element, and generating at its output said first, and respectively second reset signal.

8. The device in claim 6, wherein the first and second delay elements together apply a total cumulative delay greater than or equal to the minimum clock period with which the storing means can operate.

9. The device in claim 6, wherein the second delay element applies a delay greater than or equal to the hold time with which the storing means can operate.

10. The device in claim 1 and further comprising a third OR element, receiving at its input the first and second clock signals, and generating at its output a third clock signal for the storing means.

11. The device in claim 1 and further comprising:
a sixth D flip-flop, whose D input is designed to receive a first output data signal coming from the storing means, and whose clock input receives the first clock signal, and which generates at it output a second output data signal intended for the first module; and
a seventh D flip-flop, whose D input is designed to receive said first output data signal coming from the storing means, and whose clock input receives the second clock signal, and which generates at its output a third output data signal intended for the second module.

12. The device in claim 1 and further comprising at least one multiplexing means, each multiplexing means being such that:
it makes it possible to provide a separate control signal to the storing means;
it receives at its input a first control signal coming from the first module and a second control signal coming from the second module; and
it is controlled by said selection signal with the result being that:
if the selection signal assumes the first state, the multiplexing means generates at its output said first control signal; and
if the selection signal assumes the second state, the multiplexing means generates at its output the second control signal.

13. The device in claim 12, wherein said control signal belongs to the group comprising:
   an address signal;
   an input data signal;
   a write enable signal;
   an output enable signal;
   a memory enable signal; and
   a read signal.

14. The device of claim 1, wherein the first and second modules comprise respectively a processing unit and an IP block of a microcontroller.

15. A microcontroller comprising an arbitration device as claimed in claim 1.

* * * * *